Oct. 24, 1950 P. WROBLEWSKI 2,526,790
FASTENING DEVICE
Filed April 25, 1945 3 Sheets-Sheet 3
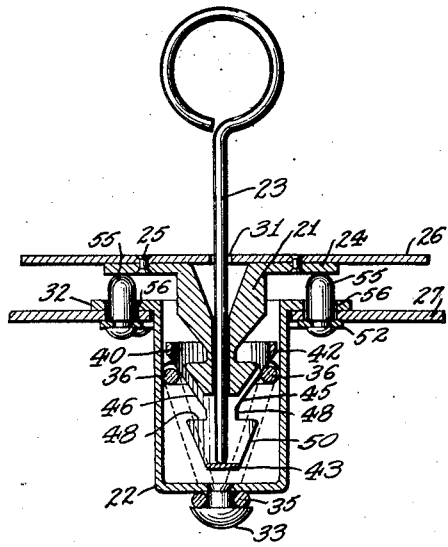
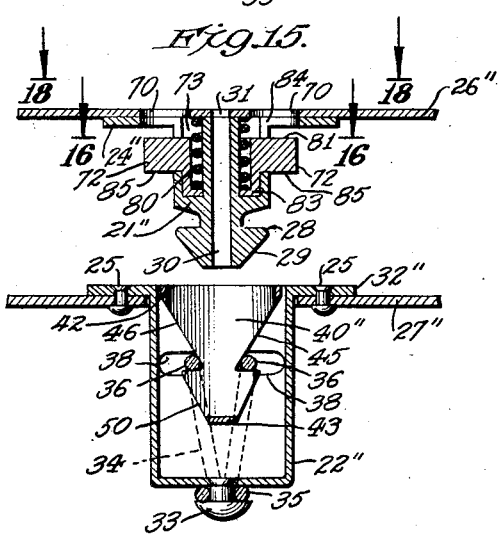
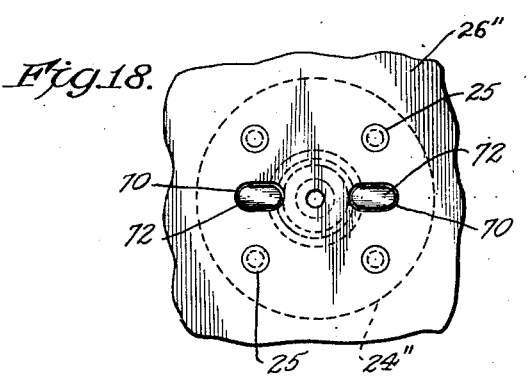
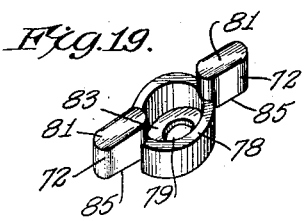
INVENTOR
POLIKARP WROBLEWSKI
BY
Edmund H. O'Brien
ATTORNEY Patented Oct. 24, 1950

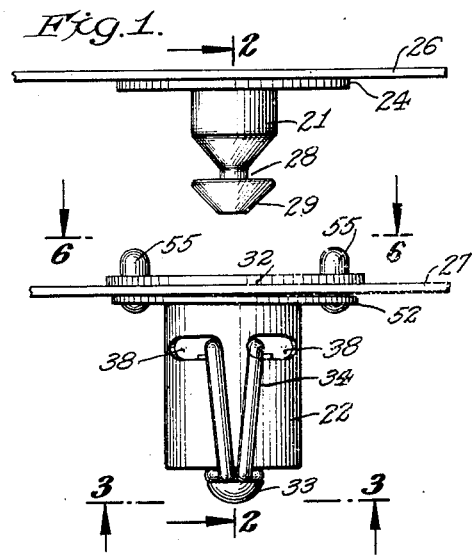
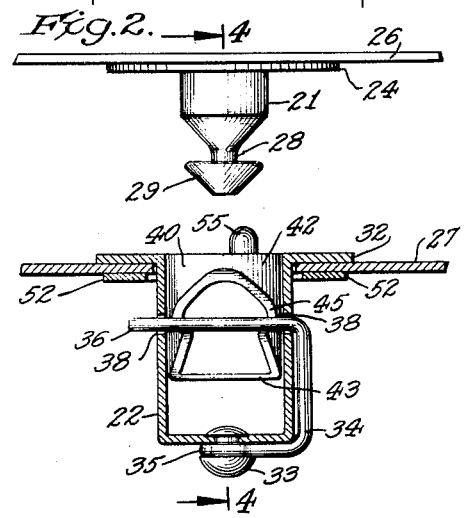
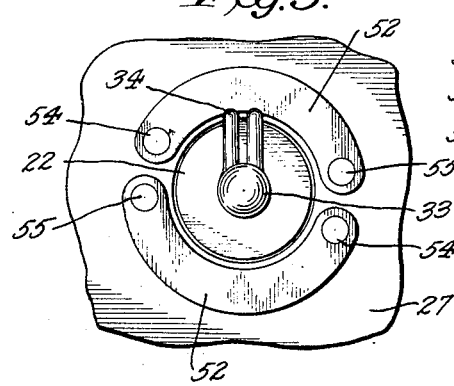
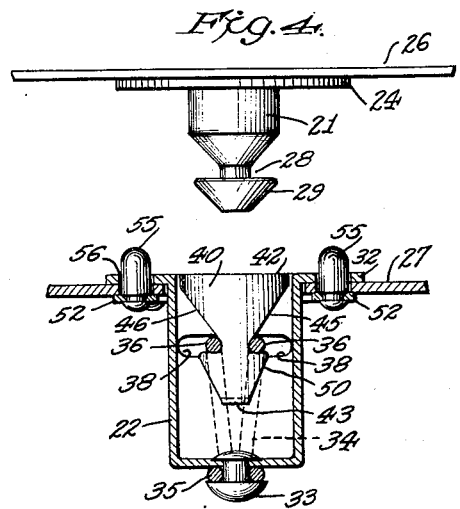
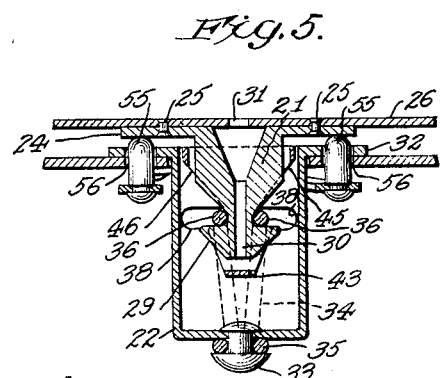
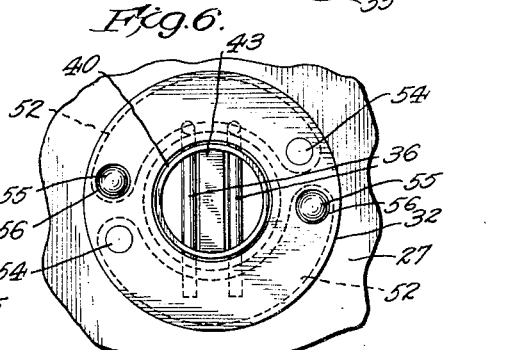
INVENTOR.
POLIKARP WROBLEWSKI
BY
Edmund H. O'Brien
ATTORNEY

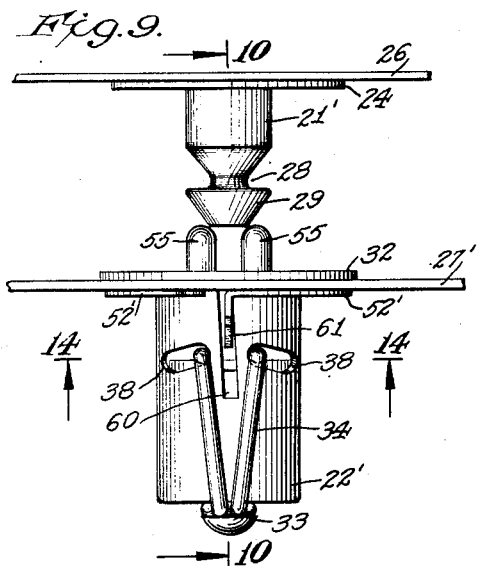
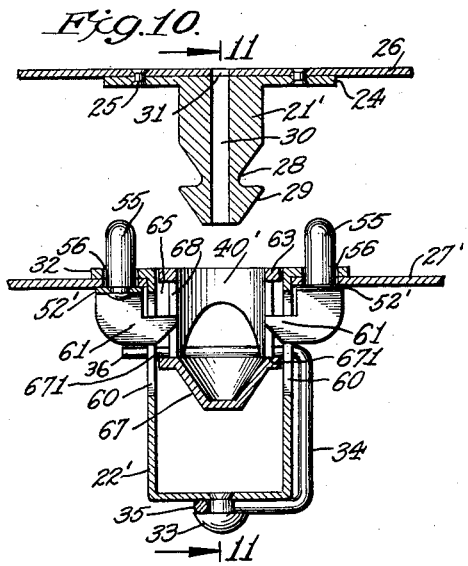
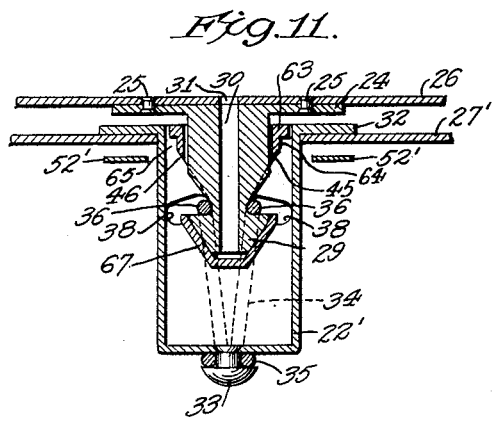
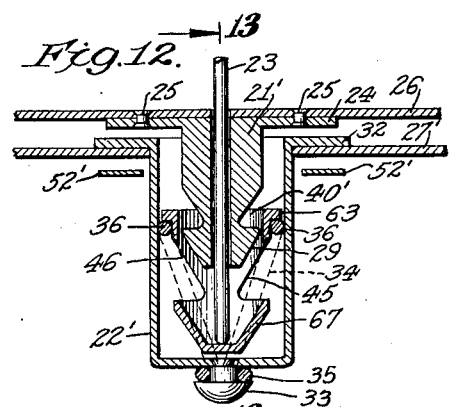
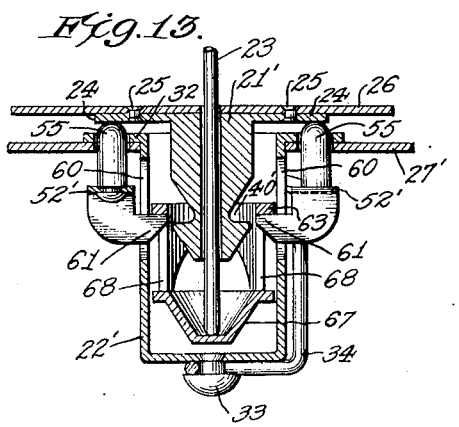
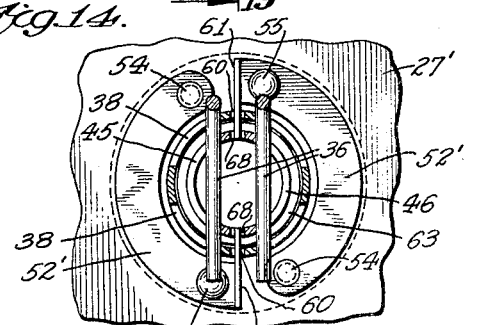

2,526,790

UNITED STATES PATENT OFFICE 2,526,790

FASTENING DEVICE

Polikarp Wroblewski, Ankara, Turkey, assignor of one-half to Frederick Archibald Pillet, Dallas, Tex.

Application April 25, 1945, Serial No. 590,177

6 Claims. (Cl. 85—7)

This invention relates to fastening devices, more particularly to a separable fastener especially adapted for use in securing metal plates to a supporting plate or surface as utilized, for example, on access doors, inspection doors, plates, or covers, cowling panels, and similar parts of aircraft.

My improved separable fastener, particularly adapted for use as a fastening device on aircraft, but suitable for other purposes for which such a separable fastener would normally be employed, is so constructed as to permit rapid closing and opening. When the grooved stud which forms one part thereof is inserted in the locking receptacle of my novel separable fastener a positive and reliable locking action is secured, superior in certainty to that of separable fasteners now available. The fastener cannot then be separated by any amount of force applied to pull the two main members thereof apart, short of destruction.

My improved fastener is also so constructed that the possibility of its accidental opening is completely eliminated. In order to unlock the fastener and permit separation of the parts thereof, the insertion of a special unlocking key is necessary. However, if this unlocking key should be lost or misplaced, as might perhaps happen on aircraft or elsewhere, the key may be readily replaced by any suitable stiff wire which may happen to be available.

In one specific embodiment of my invention, as disclosed below, positive means are included for indicating when the fastening device is closed and locked. This eliminates all possibility of danger arising from a belief that the fastening device is closed and locked, when it is in fact in the unlocked condition. Closure indicator means are of importance on aircraft and elsewhere.

Accordingly, it is one of the objects of my invention to provide a separable fastener of an improved type, particularly adapted for use on aircraft for retaining in place access doors, inspection plates, doors, or covers, hatch covers, cowling panels, etc., and other elements normally held together on aircraft by means of separable fastening devices, which fastener is of relatively simple construction, and relatively inexpensive to manufacture.

Another object of my invention is to provide a separable fastener of the type described which may be rapidly closed and locked, and which may also be unlocked with equal rapidity by the use of an unlocking key. This fastener cannot, however, be unlocked simply by pulling, without the use of the wire unlocking key.

It is an additional object of my invention to provide locking mechanism in connection with separable fasteners of the type described, which locking mechanism is positive and reliable in its action, and so constructed as to eliminate all possibility of accidental opening.

It is a further object of my invention to provide a separable fastener, the parts of which may readily be secured to plates, doors, panels, or other elements to be secured together, which fastener is completely free of protruding parts which might extend into the slip stream of the aeroplane and so introduce additional undesirable air resistance.

Still another object of my invention, in one of its preferred embodiments described below, is to provide in a separable fastener of this type indicator means for positively indicating when the fastener is closed and locked, and when it is unlocked.

The foregoing aims and objects, as well as others, will be exemplified by the ensuing disclosure of certain preferred embodiments of my invention.

My invention may best be described with reference to the annexed drawings wherein:

Fig. 1 is a view in elevation of the grooved stud and locking receptacle therefor in one embodiment of my invention;

Fig. 2 shows the grooved stud in elevation, and the locking receptacle in cross-section, this section being taken on the line 2—2 of Fig. 1, looking in the direction of the arrows;

Fig. 3 is an end or rear view in elevation of the locking receptacle, looking in the direction 3—3 as indicated in Fig. 1;

Fig. 4 is a view of the grooved stud in elevation, and a cross-sectional view of the locking receptacle, taken on the line 4—4 of Fig. 2;

Fig. 5 is a cross-sectional view similar to Fig. 4, except that the grooved stud is shown in section, and in locked position in the locking receptacle;

Fig. 6 is a front view of the locking receptacle, looking in the direction 6—6 as indicated in Fig. 1;

Fig. 7 is a cross-sectional view of receptacle and grooved stud, similar to Fig. 5, except that it shows the unlocking wire key in place, and the stud moved outwardly by action of the separating springs after pressure of the unlocking key has operated to spread the wire latch apart, thereby permitting expulsion of the grooved stud from the locking receptacle under the action of the unlocking springs. This view also shows the wire unlocking key in place in the separable fastener;

Fig. 8 is a detail view of the spring wire latch for securing the grooved stud in the locking receptacle;

Fig. 9 is a view in elevation of a modified form of my fastening device, the grooved stud and locking receptacle being both shown in elevation;

Fig. 10 is a cross-sectional view of the modified form of my fastening device shown in Fig. 9, taken on the line 10—10 of Fig. 9 looking in the direction of the arrows. This view shows the grooved stud and locking receptacle separated.

Fig. 11 is a cross-sectional view taken on the line 11—11 of Fig. 10, looking in the direction of the arrows, which shows the grooved stud locked in the locking receptacle;

Fig. 12 is a view similar to Fig. 11, except that it shows the unlocking wire key in place, the spring wire latch having been spread apart by action of the wire unlocking key and keeper to unlock the grooved stud;

Fig. 13 is a cross-sectional view similar to Fig. 12 but taken at right angles thereto, along the line 13—13 of Fig. 12 and looking in the direction of the arrows. It shows the separating spring mechanism which expels the grooved stud from the lock after the latch is spread to release the stud (as shown in Fig. 12), this separating spring mechanism at the same time serving to return the keeper to its original position;

Fig. 14 is a transverse cross-sectional view of the locking receptacle taken on the line 14—14 of Fig. 9, looking in the direction of the arrows;

Fig. 15 is a cross-sectional view of a second modified form of my improved fastening device, this modification including an indicator to show when the fastener is closed. In this view the grooved stud and locking receptacle are shown separated;

Fig. 16 is a transverse cross-sectional view of the grooved stud, of the second modified form, taken on line 16—16 of Fig. 15; looking in the direction of the arrows;

Fig. 17 is a cross-sectional view similar to Fig. 15, except that it shows the grooved stud locked in place in the locking receptacle;

Fig. 18 is a front view of the locked fastener, taken on the line 18—18 of Fig. 15, looking in the direction of the arrows, and showing the indicator in the position it assumes when the fastener is closed and the grooved stud locked in place; and Fig. 19 is a perspective view of the indicator lug carrier and indicator lugs, forming part of the grooved stud construction in the second modified form of my improved separable fastener.

Referring more particularly to the modification of my fastening device shown in Figs. 1 to 8, inclusive, my fastener is particularly adapted for securing the grooved stud 21 in the cylindrical locking receptacle 22, retaining it in the locking receptacle in locked condition until its release is permitted by insertion of the unlocking wire key 23 shown in Fig. 7. The grooved stud 21 is formed with, or may have attached thereto, an annular flange portion 24 through which may be passed rivets 25 for securing the stud to a plate 26. Plate 26 may be, for example, an inspection door cover, hatch cover, cowling plate, or other closure on an aeroplane, or it may be any plate which is to be secured to another plate 27, to which the locking receptacle 22 is secured, by means of the separable fastener illustrated. While the annular flange 24 of the stud 21 is shown riveted to the plate 26, it may, of course, be welded thereto, or otherwise suitably secured.

The stud 21 is shaped to include a grooved portion 28, the sides of which may taper at one side, but are generally at right angles to the axis of the stud at the other, and a tapered head 29, so formed as to permit it to readily enter the locking receptacle 22 by pushing the spring latching wires apart, as will subsequently be explained. The stud 21 is also provided with a bore or aperture 30 extending therethrough, through which the wire unlocking key 23 may be passed in unlocking the fastener. The plate 26 is provided with a hole or aperture 31 in registration with the aperture 30 extending through the stud 21, in order to permit entry of the wire unlocking key 23 in unlocking the separable fastener, thereby permitting separation of the stud 21 and locking receptacle 22 and the plates or parts carried thereby.

For convenience of description the part of the fastener carrying the stud may be referred to as the "male part" and the part carrying the receptacle as the "female part." The cylindrical locking receptacle 22 is formed with annular flange or collar 32 which may be secured by rivets (not shown), welding, or otherwise to the plate 27. This plate may be any member which is to be held by a separable fastener to another member and may, for example, be the fuselage of an airplane to which a cowling plate is to be removably secured, or in which an inspection door or cover (represented by the numeral 26) is to be secured in locked condition, but which may readily be unlocked and separated by use of the wire unlocking key 23.

The locking receptacle 22 is provided with a bolt or rivet 33 in its end section which serves to secure the spring latch wire 34, shown in Fig. 8, in operative relationship with the receptacle. As shown in Fig. 8, the spring latch wire 34 is bent to provide a loop 35, which is held in place against the end of the receptacle 22 by the bolt or rivet 33, and with two parallel straight portions or tines 36 which extend into the receptacle 22 and serve as the latch, fitting in the groove 28 of the stud 21 and serving to hold the stud in place in the locking receptacle when the two parts of the separable fastener are locked together. The tapered head 29 of the stud 21 is shaped to spread the latching wires 36 apart when the stud is pressed into the locking receptacle 22, and the wires 36, because of the springy or resilient arrangement of the spring latch wire 34, will spring back to latch the stud in place after the tapered head 29 has passed beyond the latching wires 36.

The locking receptacle 22 is provided with four elongate apertures 38 through which the latching wires 36 pass, each wire extending through two of the apertures, and in which the wires are adapted to move during insertion of the tapered head 29 of the stud 21 in locking the fastener, and during the unlocking operation wherein key 23 is utilized as will subsequently be described. Interiorly of the locking receptacle 22 there is positioned the keeper 40, which is adapted for restricted movement into the locking receptacle 22 against the action of the spring wire latch 34. As shown, the keeper 40, which is open at its exterior end to permit entry of the stud 21, is generally cylindrical at its upper part 42, adjacent the flange 32 of the locking receptacle 22, but is cut away or otherwise formed at that portion thereof fitting within the locking receptacle 22 to provide a lower strap or contact strip portion 43 for contact with the wire unlocking key 23, and with two camming surfaces 45 and 46 which bear against and serve to force the latching wires 36 apart when pressure is applied against the strap or contact portion 43 with the key 23, thereby forcing the keeper 40 inwardly into the receptacle 22 against pressure of the spring wire latch 34. As shown perhaps most clearly in Fig. 7, each cam surface 45, 46 of the keeper 40, at either end, terminates in a notch 48 formed between the camming surface and the generally trapezoidally-shaped part of the keeper 50 to which, at either end, the strap or contact strip portion 43 is joined. When pressure against the contact strip 43, as by the key 23 or otherwise, is released, the spring action of the latching member 34 acts to force the keeper 40 outwardly again, latch wires 36 riding against the camming surfaces 45, 46, until its upper cylindrical part 42 is substantially flush, at its outer edge, with the annular flange 32 of the locking receptacle 22.

On the back of the plate 27, to which the locking receptacle 22 is secured, and closely surrounding the locking receptacle, are the two warped spring members 52, which may be constructed in arc form. As shown, these warped springs may be fastened at one end of each to the plate 27, or to the locking receptacle 22, or to both, by rivets or bolts 54. The other or free end of each of the springs 52 is provided with a small stud or pin 55, suitably riveted, welded, or otherwise secured to the spring. These studs 55 extend outwardly through apertures 56 provided for them in the plate 27 and in the annular flange or collar 32 of the locking receptacle 22. Normally, by action of the warped springs 52, the studs 55 are urged outwardly through the apertures 56 so that they project, as shown in Figs. 1, 2, 4 and 6, from the flange 32 and plate 27. But when pressure is applied against the studs 55 they may be forced into the apertures 56 against the action of the springs 52, so that they do not project beyond the flange 32, or very much beyond this flange, as shown, for example, in Fig. 5.

The locked position of grooved stud 21 in the locking receptacle 22 of the separable fastener is shown in Fig. 5. The latching wires 36 are spread apart when the tapered head 29 of the stud 21 is inserted in the locking receptacle 22. The latch wires 36 are then forced back by spring action of the spring latch wire 34 until the latch wires fit into the groove 28 in the stud 21, being retained back of the perpendicular side of that groove, when the tapered head 29 has passed beyond the latch wires 36 in entering the receptacle 22. In the process of forcing the grooved stud 21 into the locking receptacle, the studs or pins 55 on the warped springs 52 are forced back in the apertures 56 against the action of these springs until they assume a final position somewhat similar to that illustrated in Fig. 5. The fastener is then securely locked, and plates or elements 26 and 27 secured thereto are held tightly together in locked condition. No part projects beyond the plate 26, which is especially important, for example, when an access door or an inspection plate for aircraft (which plate 26 might represent), is secured in locked condition to the body of the aircraft. By eliminating projecting or protruding parts additional wind resistance is avoided.

However, when it is desired to unlock and separate the two parts all that it is necessary to do is to insert wire unlocking key 23 through the aperture 31 in the plate 26, and through bore or aperture 30 in the grooved stud 21, so that its end portion may press against the strap or contact strip 43 of the keeper 40. Obviously if the key 23 should not be available, or be lost or mislaid, it might be replaced by any stout piece of wire.

What happens when pressure is applied by means of the key 23 against the contact strip 43 is illustrated in Fig. 7. The latching wires 36 are forced outwardly by means of the camming surfaces 45, 46 of the keeper 40, thereby moving them out of the groove 28 of the stud 21. The keeper 40, as shown in Fig. 7, is moved inwardly with respect to the locking receptacle 22 against the spring action of the wire latch 34. This releases the grooved stud 21 and the plate 26 carried thereby. Immediately upon withdrawal of the latch wires 36 the small studs or pins 55 secured to the warped springs 52 are no longer held in the position in the apertures 56 that they have been forced into by pressure of the stud flange 24. Urged by the springs 52 they are therefore forced sharply outward, thereby pressing against the flange 24 and separating the stud 21, from the locking receptacle 22 by a positive ejecting force. The pressure of the springs 52, and the unlocking or separating push imparted thereby, is of considerable importance where, as frequently in aircraft and elsewhere, a hatch cover, inspection door, access door, etc., must be given a push or impulse of some kind to insure its release against air pressure or some other force which tends to hold it in closed condition. After the stud 21 has been released the keeper 40 is again urged outwardly to a position at which its outer portion 42 is approximately flush with the flange 32 of the locking receptacle 22 by action of the spring wire latch member 34, the latching wires 36 moving inwardly to their locking position along the camming surfaces 45, 46. Of course, in order to effect this release, only a slight impact or push with the key 23 against the contact strip 43 is necessary, the key being then withdrawn until again necessary for further unlocking use.

The fastening device described and illustrated in Figs. 1 to 8 is very satisfactory for many purposes, but it is not entirely satisfactory for securing very rigid doors in place in a frame or supporting structure. With very rigid doors the warped springs 52 are not strong enough to force the stud 21 and locking receptacle 22, and the door or plates carried thereby, apart, especially where the plates 26 and 27 are held together by a number of such separable fasteners. When one fastener is unlocked by the key 23 the remaining fasteners stay closed, thereby keeping plates 26 and 27 securely in contact. When the unlocking wire key 23 is withdrawn the keeper 40 will be forced outwardly in the locking receptacle 22 again, under the action of the wire spring 34, thus again locking grooved stud 21 in place by means of the latching wires 36 fitting into the groove 28 of the stud 21.

In order to avoid this, and to provide means for holding the keeper 40 in the retracted position with the latch wires 36 held apart until the grooved stud 21 is forcibly ejected from the locking receptacle 22, the modification shown in Figs. 9 to 14 has been developed. In this modification, which insures the opening of the fastener under adverse conditions, the same number of parts is utilized, but some of them are modified in construction. Similar parts have been given the same numeral in both embodiments but, to avoid confusion some of the reference numerals in this embodiment (Figs. 9 to 14) have been designated with a "prime" symbol, and, insofar as they are the same, the description will not be repeated.

As shown, the grooved stud 21' is constructed as in the first modification, with collar or flange 24 secured to plate or other member 26, groove 28, and tapered head 29.

The locking receptacle 22' is also constructed generally as in the first embodiment with bolt or rivet 33 for securing the wire latching spring 34 in place, and with four slots 38, the latch wires 36 projecting through these slotted openings and travelling therein. However, the cylindrical locking receptacle 22' is also provided with two additional slots 60 in a direction generally parallel to its axis, generally at about right angles to slot 38, to permit backwards and forwards travel therein of terminal hooked portions 61 of the warped springs 52'. These hooks are formed by bending over the free end portion of the warped springs 52', remote from the rivets 54 securing them to the locking receptacle 22' or plate 27', at right angles to the flange 32, and then extending part of the bent over portion inwardly into the slots 60 in the shape of a hook 61 as shown. These hooked portions serve a function which will subsequently be described.

The keeper 40' is also constructed somewhat differently, being formed with an upper cylindrical flange or collar 63, from which depends a cylindrical portion of relatively small height, 64, in which the camming surfaces 45, 46 for the spring latch wires 36 are cut or otherwise formed. These camming surfaces are essentially the same shape as in the first embodiment and serve the same purpose except that, because of the construction of the bearing member for the key 23 subsequently to be described, there are no notches 48 (Fig. 7), nor are there any trapezoidally-shaped portions 50 joining a contact strip 43 at either end. It should be noted that the depending cylindrical wall 64 of the keeper 40' is separated from the inner wall of the locking receptacle 22' a small distance, a distance sufficient to form with the flange 63 a space 65 to receive and seat the latch wires 36 as shown in Fig. 12. The keeper 40' may be forced into the locking receptacle 22' against the action of the wire spring 34, and is urged outwardly by the spring wire latch 34 until its flange 63 is approximately flush with the flange 32 of the locking receptacle, as in the first embodiment of my invention described above.

The inner portion of the keeper 40', below the camming surfaces 45, 46, forming the release or unlocking contact strip, is constructed in generally frusto-conical form as indicated at 67, thereby providing a bearing or contact portion to receive the unlocking key 23 when the separable fastener is unlocked. The outer edge portion 671 of the frusto-conical release portion 67 of the keeper 40' may be shaped or bent over to provide a smooth bearing surface for the latch wires 36. In the sides of the depending cylindrical portion 64 of the keeper 40' there are cut or otherwise formed two slots 68, in which the hook portions 61 of the warped springs 52' are adapted to travel, these hooks serving to retract the keeper 40' under proper conditions to its outer position with flange 63 approximately flush with flange 32 (Fig. 11), as explained below. The slots 68 are generally parallel to the axis of the keeper 40', in registration with the slots 60 in the cylindrical locking receptacle 22', and may be somewhat wider at their outer ends, adjacent flange 63, than at their inner ends to accommodate any lateral or sidewise movement of the hook portions 61 as the springs 52' are constructed or released.

When the grooved stud 21' is inserted in the locking receptacle 22', the latching wires 36 are spread apart by the tapered head 29, exactly as in the first embodiment. After the head is fully inserted the latching wires 36 spring back in place in the groove 28 (Fig. 11) to hold the stud locked in the locking receptacle 22', the studs or pins 55 of the warped springs 52' being forced back in the apertures 56 against the action of the springs by pressure exerted on them by the stud flange 24, to which is secured the plate 26. Plates 26 and 27' are thus held in locked position. Should the plate 26 be that of an aircraft inspection cover or access door, for example, and the locking receptacle 22' attached to the door frame plate or some other part of an aircraft structure, it is clear that the door would be securely held in closed position.

When it is desired to unlock the fastener in order to separate the stud 21' and locking receptacle 22', and the members secured thereto, the unlocking key 23 is introduced through the apertures 31 and 30, as in the first form described above, until pressure may be applied by its end portion against the frusto-conical release portion 67 of the keeper 40'. As the keeper 40 is pressed inwardly into the locking receptacle 22', as shown in Fig. 12, the latch wires 36 are spread outwardly by means of the camming surfaces 45, 46 until they enter the space 65 between the depending cylindrical portion 64 and wall of the locking receptacle 22', adjacent the flange 63, as shown. Spreading the latch wires 36 to unlocked position releases the grooved stud 21', and if the pressure imparted to that stud against its flange 24 by means of studs or pins 55 attached to the stressed springs 52' is sufficient, the grooved stud is forcibly ejected by spring action from the locking receptacle 22'. However, if the force of the spring is not sufficient to overcome outside force, upon removal of the unlocking key 23 the latching wires 36 are left in the spread position or unlatched position, being retained in the space 65 by the depending cylindrical flange 64, and they are not allowed to slide back along the camming surfaces 45, 46 under their own spring action to the latched condition shown in Fig. 11.

The ability to remove the unlocking key 23 and still leave the fastener in the unlocked condition with grooved stud 21' unlatched is of considerable importance where the plate 26 is, for example, an access door, inspection cover, or hatch cover on an aeroplane, and is held by a number of such separable fasteners. The pressure of the warped springs 52' may not be sufficient to force apart the grooved stud 21' and receptacle 22' when one such fastener is unlocked, but the fastener will remain in the unlocked condition until a number of other such fasteners, or all other fasteners, are similarly unlocked. The combined pressure of all the springs 52' will then be sufficient to force the grooved studs 21' of all fasteners from all the locking receptacles 22', thus separating plates 26 and 27'.

When the pressure of springs 52' is sufficient to eject the studs 21' and plate 26 carried thereby, the springs also serve an additional function, that of returning the keeper 40' to its original position, wherein the outer surface of its collar or annular flange 63 is substantially flush with flange 32 of the locking receptacle 22'. This is accomplished by means of the hook portion 61 of the warped springs 52'. These fit under the collar or flange 63, and, as the springs 52' return to their unstressed position, the hooks 61 spring or move sharply forward in slots 60, giving a sharp impulse to the flange 63 of keeper 40' which frees the latch wires 36 and returns the keeper to its original position. This impulse is sufficient to pull the latch wires 36 out of the spaces 65, permitting them to slide back over the camming surfaces 45, 46 to their latched position. It is evident that it is these latch wires bearing against cylindrical portion 64 of the keeper 40' which keeps the keeper from returning under the action of the spring wire latch 34 to its original position with flange 63 approximately flush, at its outer surface, with flange 32. When the latch wires 36 are forcibly moved out of the spaces 65 by action of the hooks 61 and springs 52', there is nothing holding the keeper 40' within the locking receptacle 22', and it readily returns to its forward position. It should be noted, however, that this works one way only, and it is possible to push the warped springs 52' inwardly, stressing them, without affecting the position of the keeper 40'. The fastener is now again ready for the insertion of grooved stud 21' in another locking operation.

The third embodiment of my improved separable fastener shown in Figs. 15 to 18 includes positive and reliable means for showing when the fastener is closed. It is also somewhat easier to assembly than the two previously-described embodiments, since the device is entirely self-contained. In this form identical reference numerals have been applied to parts which are the same as those in the other embodiments, but, to avoid confusion, some have been designated with a "double prime" symbol.

The locking receptacle 22" is substantially identical with that of the first embodiment, as above described, except that the warped separating springs 52 have been omitted. In omitting the springs 52 the apertures 56 through plate 27" are omitted. Flange or collar 32" of the locking receptacle 22" differs somewhat from flange 32 in Figs. 1 to 8 since there are no protruding studs or pins 55 extending therethrough. The action effected by the warped springs 52 is secured by spring means positioned in the grooved stud 21", as will presently be described.

The keeper 40" and spring wire latching member 34, with latch wires 36, are in all respects identical with their counterparts in the first embodiment.

The grooved stud 21" is, however, constructed differently from that of the first embodiment. It is provided with flange 24" for attachment to plate 26" by rivets 25, welding, or otherwise, with groove 28, tapered head 29, and bore or aperture 30 for the unlocking key 23. Plate 26" also has the aperture 31 formed therein for the unlocking key 23. But this plate, as well as the stud flange 24", are also provided with the registering apertures 70, of oblong or slot shape, in which are positioned the indicating lugs 72 which show when the fastener is closed.

The grooved stud 21" is formed with an annular hollow portion 73 between the central post or boss 74, and outer hollow cylindrical portion 76. In this hollow space 73 the hollow indicator lug carrier 78 (Fig. 19 is adapted to slide. As shown, this is constructed generally in the form of a cap with an aperture 79 through it for the boss 74, and with extending indicator lugs 72 secured thereto.

Helical spring 80 surrounding the boss 74 normally forces the indicator lug carrier 78 down into the annular space 73, in the direction of the tapered head 29, in which position the external surfaces 81 of the indicator lugs 72 are somewhat below the level of the stud flange 24" and plate 26". The helical spring 80 is seated between that portion of plate 26" surrounding the aperture 31 and the flat ring portion 83 of the indicator lug carrier 78 which is provided with the aperture 79. Two opposed slots 84 are provided in the outer hollow cylindrical portion 76 of the grooved stud 21" for movement back and forth therein of the indicator lugs 72.

Normally the indicator lug carrier 78 and the indicator lugs 72 are held in the retracted position shown in Fig. 15 by action of the helical spring 80. When the tapered head 29 of the grooved stud 21" is inserted in the locking receptacle 22", in securing stud 21" and receptacle 22, and the plates or other elements carried thereby, in locked condition, the head spreads the latching wires 36 apart, these wires riding along the camming surfaces 45, 46 of the keeper 40", exactly as in the first embodiment above described. However, the lower surfaces 85 of the extending indicator lugs 72 are pressed against the flange 32" of the locking receptacle 22" as the stud is inserted, and they are forced forward against the action of the helical spring 80 which is compressed in the operation. As the latching wires 36 spring back over the tapered head 29 and seat in the groove 28, thereby locking the grooved stud in place in the locking receptacle 22", the indicator lugs 72 have moved forward in the apertures 70 in flange 24" and plate 26 until their external surfaces 81 are about flush with the outside of the plate 26" of the door or other element which is locked in place. The stud 21" is then latched in place in the receptacle 22" in the locked position, shown in Fig. 17. From the front the indicator lugs 72 are visible as shown in Fig. 18 and show that the stud is securely locked in the locking receptacle. Conversely, if the indicator lugs 72 are not visible and flush with the outer plate in the slots 70, it is evident that the fastener has not closed properly and needs further attention.

When it is desired to unlock the fastener, the wire unlocking key 23 is inserted through apertures 31 and 30, into contact with the contact strip 43 of the keeper 40", exactly as in the first embodiment of my invention. If the key should be lost or misplaced it may be replaced by any stout wire. Pressure against the contact strip 43 causes the keeper 40" to go further into the locking receptacle 22", the latching wires 36, at the same time, being spread laterally by the camming surfaces 45, 46 to release the grooved stud 21". When the latching wires 36 are removed from the groove 28, helical spring 80 is no longer held in the compressed position and it expands, the lower surfaces 85 of the indicator lugs 72 pressing against the flange 32" of the locking receptacle 22" and thus imparting to the grooved stud 21" a positive separating force, sufficient to overcome outside pressure, if any, tending to oppose separation. The helical spring 80 and indicator lugs 72 thus function similarly to the warped springs 52 and the studs or pins 55 of the first two embodiments to supply a positive separating force when the grooved stud 21" is unlocked by lateral movement of the latch wires 36.

After the grooved stud 21" is ejected from the locking receptacle 22", the latching wires 36 slide inwardly along the camming surfaces 45, 46, urged by spring action of the spring wire latching member 34, thereby moving the keeper 40" forward in the locking receptacle 22" until its upper cylindrical part 42 is substantially flush, at its outer edge, with the annular flange 32" of the locking receptacle 22". Urged by helical spring 80 the indicator lug carrier 78, and indicator lugs 72, are forced inwardly in the hollow space 73 between boss 74 and outer cylindrical portion 76 of the grooved stud 21". In this operation the indicator lugs 72 slide downwardly, toward the tapered head 29, in the slots 84 provided therefor in the outer cylindrical portion 76. The grooved stud 21" has then returned to its original condition, as shown in Fig. 15. Obviously only a slight pressure applied against the contact strip 43 of the keeper 40" by means of the wire unlocking key 23 is necessary to effect this separation, keeper 40" and indicator lugs 72 being returned to their original positions by action of the springs 34 and 80, respectively.

Obviously the last described embodiment of my invention is more easily assembled than the other embodiments, since all that is necessary is to secure the grooved stud 21" and locking receptacle 22" to the necessary members, all other working parts being enclosed within these two major parts of my fastener.

It is evident that in all the foregoing embodiments of my invention there is no tendency for vibration as a result of slackness or loose parts, since the spring-urged means maintain the latch wires 36 in taut condition, and other spring means serve to eject the grooved stud from the locking receptacle when the latch wires are removed from the groove 28. Moreover, to permit the insertion of the unlocking key 23 to open the separable fastener, only the relatively small and aerodynamically clean hole 31 in the plate, door, panel, or other member 26 is necessary. The fastener is readily closed by pressure without the use of a special tool, and to unlock or open it only the wire unlocking key 23 is required.

While I have found that my improved separable fastening device as described is particularly suitable for use on aircraft, particularly for retaining inspection doors, access doors, plates, cowling panels, etc., in place, my separable fastener is, of course, not limited to such use, but may be employed wherever separable fasteners are now used to retain parts removably in place. While I have described but one separable fastener, it is of course obvious that, in general, in order to retain the secured parts in place, it would usually be necessary to use more than one fastener.

Various changes and modifications may be made in the construction of my improved separable fastener, certain preferred embodiments of which have been herein described, without departing from the scope of my invention. Thus, the various parts might be interchanged, or the various elements thereof might be constructed in slightly different form. It is my intention that such modifications and changes, insofar as they are within the scope of the appended claims, shall be construed as within the scope of my invention.

I claim:

1. A separable fastener having a male and a female part, a stud on the male part having a transverse groove thereon and a bore therethrough, a receptacle on the female part, spring latching means positioned in said receptacle engaging said groove and maintaining said stud in locked position when so engaged, a hollow keeper of generally cylindrical shape receiving said stud and axially movably mounted within said receptacle in response to the action of an unlocking key inserted through said bore for unlocking said grooved stud in response to the action of said key, said keeper being provided with camming surfaces bearing against said latching means for moving said latching means out of engagement with the groove in response to movement of said keeper so that said grooved stud is released and spring means on said fastener urging said stud from said receptacle and positively separating said male and female parts from locking position immediately upon disengagement of said spring latching means from said groove in response to axial movement of said keeper.

2. A separable fastener having a male part and a female part, a stud on the male part having a transverse groove thereon, a receptacle on the female part, a hollow keeper in said receptacle receiving said stud, spring latching means positioned in said receptacle engaging said groove, said hollow keeper being axially movably mounted within said receptacle in response to the action of an unlocking key for unlocking said grooved stud in response to the action of said key, said keeper being provided with camming surfaces bearing against said latching means for moving said latching means out of engagement with the groove in response to movement of said keeper so that said grooved stud is released and spring urged means on said fastener urging said stud from said receptacle and acting to positively separate said male and female parts from locking position when said spring latching means releases said stud.

3. A separable fastener having a male part and a female part, a stud on the male part having a transverse groove thereon, a hollow keeper member receiving said stud, a receptacle on said female part, wire spring latching means secured to said receptacle and engaging said groove and maintaining said stud in locked position when so engaged, said hollow keeper member being mounted within said receptacle for axial movement therein and being movable axially in said receptacle in response to the action of an unlocking key for unlocking said grooved stud in response to the action of said key, said keeper member being provided with camming surfaces bearing against said latching means for moving said latching means out of engagement with said groove in response to the movement of said keeper member so that said grooved stud is released and unlocked, and spring urged means on said fastener urging said stud from said receptacle and positively moving said stud axially in said keeper member out of locking position and positively separating said male and female parts immediately upon disengagement of said latching means from said groove in response to axial movement of said keeper.

4. A separable fastener having a male part and a female part, a stud on the male part having a transverse groove thereon, a hollow keeper having a substantially cylindrical wall portion receiving said stud, a receptacle on said female part, wire spring latching means positioned in said receptacle engaging said groove and maintaining said stud in locked position when so engaged, said hollow keeper being mounted within said receptacle for axial movement therein and being movable axially in said receptacle in response to the action of an unlocking key for unlocking said grooved stud in response to the action of said key, said keeper having cut out portions in its said cylindrical wall portion providing camming surfaces bearing against said latching means for moving said latching means out of engagement with said groove in response to the movement of said keeper so that said grooved stud is released and unlocked, and spring urged means on said fastener urging said stud from said receptacle and positively moving said stud axially in said keeper out of locking position upon disengagement of said latching means with said groove and positively separating said male and female parts from locked engagement, said spring urged means comprising a plurality of flat springs in arc form surrounding said receptacle, each of said springs being secured at one end to said female part and the opposite end of each flat spring having a pin yieldably engaging said male part.

5. A separable fastener having a male part and a female part, a stud on the male part having a transverse groove thereon, a hollow keeper having a substantially cylindrical wall portion receiving said stud, a receptacle on said female part, wire spring latching means secured to and extending through said receptacle and engaging said groove to maintain said stud in locked position when so engaged, said hollow keeper being mounted within said receptacle for axial movement therein and being movable axially in said receptacle in response to the action of an unlocking key for unlocking said grooved stud in response to the action of said key, said keeper being provided with camming surfaces bearing against said latching means for moving said latching means out of engagement with said groove in response to the movement of said keeper so that said grooved stud is released and unlocked, and spring urged means on said fastener urging said stud from said receptacle and positively moving said stud axially in said keeper out of locking position upon disengagement of said latching means with said groove and positively separating said male and female parts from locked engagement, said spring urged means comprising a plurality of flat warped springs in arc form surrounding said receptacle, each of said springs being secured at one end to said female part and the opposite end of each flat spring having a pin member yieldably engaging said male part and a hook portion engaging said keeper and urging said keeper to locking position upon separation of said male and female parts.

6. A separable fastener having a male part and a female part, a stud on the male part having a cylindrically shaped shank, a flange at its outer end and a pointed nose at its inner end, said stud having a longitudinal bore therethrough for insertion of an unlocking key, a transverse groove around said shank above said nose, a hollow keeper having a cylindrical side wall receiving said stud, a cylindrical receptacle on said female part, a latch spring wire secured to said receptacle and having tines engaging said groove and maintaining said stud locked when so engaged, said hollow keeper being mounted within said receptacle for axial movement therein and being movable axially in said receptacle in response to the action of an unlocking key inserted through said bore for unlocking said grooved stud in response to the action of said key, said keeper having a pair of oppositely disposed cut out portions forming camming surfaces bearing against said tines for moving them out of engagement with said groove in response to the movement of said keeper so that said grooved stud is released and unlocked, spring urged means on said fastener engaging said flange and urging said stud from said receptacle and positively moving said stud axially in said keeper out of locking position upon disengagement of said latching means with said groove and positively separating said male and female parts from locked engagement, and an indicator member engaging said spring means and mounted for axial movement on said stud, said indicator member compressing said spring when said male and female parts are in locked engagement in which position the outer surface of said indicator member lies flush with the outer surface of said male part and said spring means acting to move said indicator member toward said nose when said male and female parts are in unlocked position in which position the outer surface of said indicator member lies below the outer surface of said male part.

POLIKARP WROBLEWSKI.

REFERENCES CITED

The following references are of record in the file of this patent:

UNITED STATES PATENTS

| Number | Name | Date |
|---|---|---|
| 572,735 | Thompson | Dec. 8, 1896 |
| 1,309,389 | Wilson | July 8, 1919 |
| 1,541,317 | Bellavance | June 9, 1925 |
| 2,380,568 | Adams | July 31, 1945 |
| 2,442,398 | Chandler | June 1, 1948 |

FOREIGN PATENTS

| Number | Country | Date |
|---|---|---|
| 14,005 | Great Britain | June 18, 1907 |
| 47,320 | France | Nov. 25, 1936 |
| 438,996 | Germany | Dec. 31, 1926 |